United States Patent Office 3,460,694
Patented Aug. 12, 1969

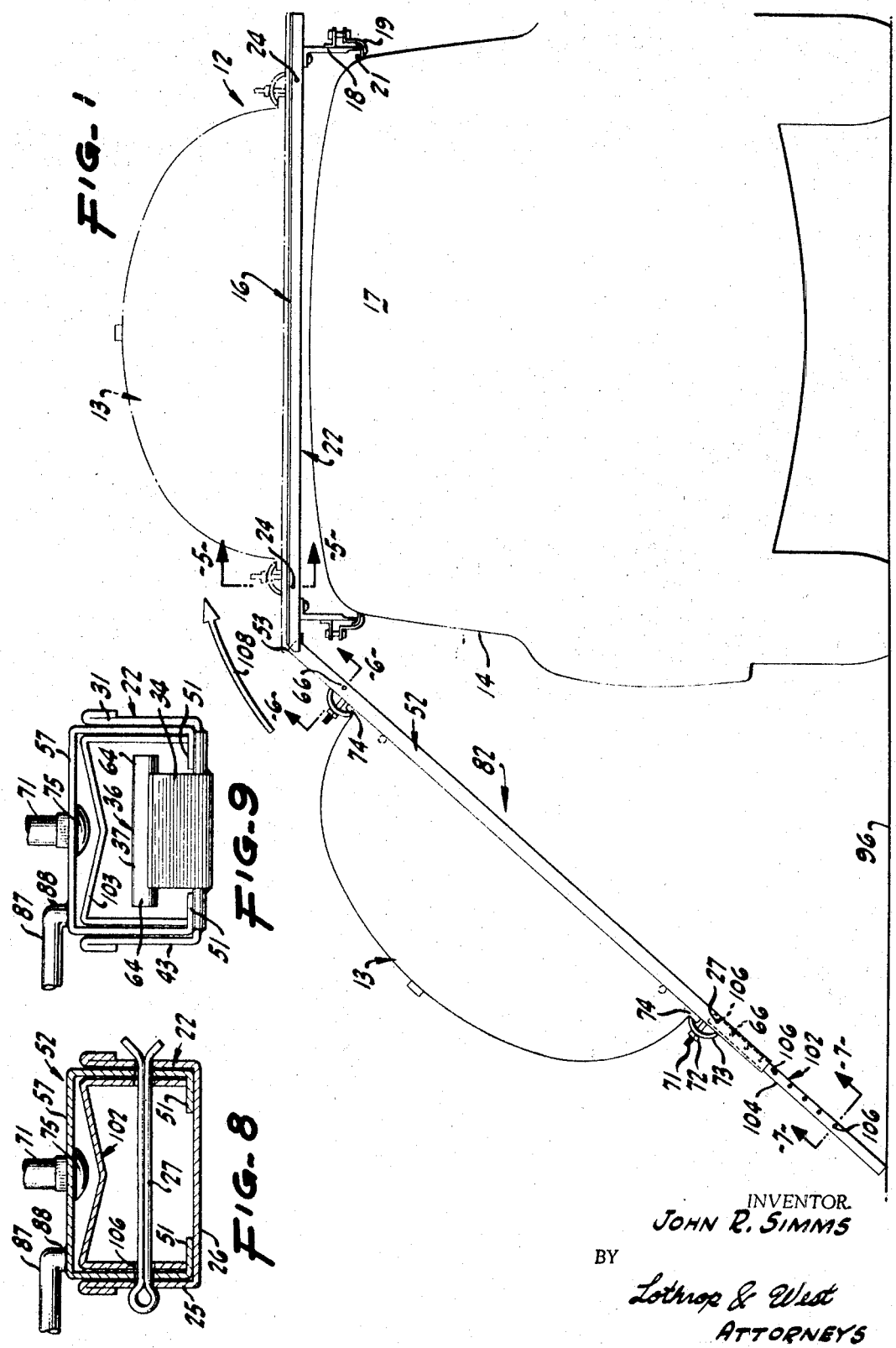

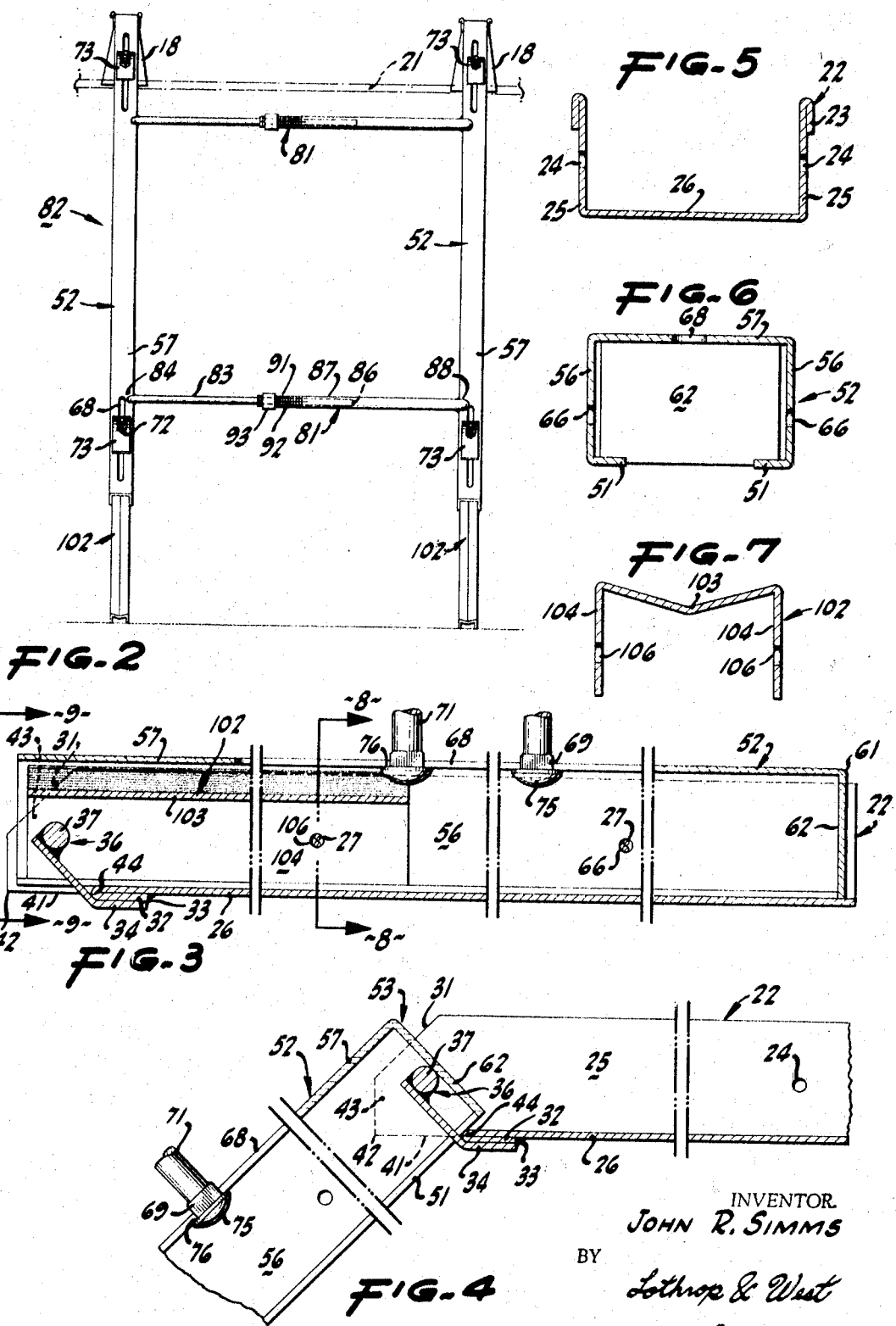

3,460,694
CAR TOP BOAT HANDLING DEVICE
John R. Simms, 7495 Christine Ave.,
Riverside, Calif. 92509
Filed Sept. 18, 1967, Ser. No. 668,437
Int. Cl. B60r 9/04
U.S. Cl. 214—450     2 Claims

ABSTRACT OF THE DISCLOSURE

An inclined rack, capable of carrying a boat, is pivotally mounted at its upper end on the side of a horizontal framework on the top of an automobile, the lower end of the rack being supported on the ground. The rack is loaded by tilting it upwardly to horizontal attitude and sliding it into nesting engagement with the car top framework to which it is then secured. Unloading is effected by reversing the foregoing procedure.

---

The invention relates to improvements in car top boat loading and carrying devices.

The patent art as well as the market place are replete with car top luggage and ski racks, and with many kinds of carriers for small boats.

However, while luggage and skis are readily loaded and unloaded from these racks, the task of lifting and positioning a bulky, often heavy, boat, and subsequently removing the same is frequently an onerous and even hazardous one.

It is therefore an object of the invention to provide a car top boat handling device which is capable of loading, positioning, carrying and unloading a boat with safety and dispatch.

It is another object of the invention to provide a boat handling device which is readily attached to and detached from the top of a motor vehicle.

It is a further object of the invention to provide a boat handling and transporting device which is efficient and economical, yet which is light in weight, durable and easily manipulated.

It is another object of the invention to provide a generally improved car top boat handling device.

Other objects, together with the foregoing, are attained in the embodiment described in the following description and shown in the accompanying drawings in which:

FIGURE 1 is a rear elevational view, to a reduced scale, showing a boat mounted on the boat rack in extended, inclined position, preparatory to loading onto the top of a passenger vehicle, as shown in outline;

FIGURE 2 is a slide elevational view of the FIGURE 1 boat rack structure;

FIGURE 3 is a fragmentary, median, longitudinal sectional view of the stationary channel, the slidable rack member and the extension member in retracted location, portions of the structure being broken away to reduce the extent of the figure;

FIGURE 4 is a fragmentary, median, longitudinal section showing the pivot structure with the slide member in fully extended and inclined position;

FIGURE 5 is a cross-sectional view to an enlarged scale, of the stationary channel member, the plane of the section being indicated by the line 5—5 in FIGURE 1;

FIGURE 6 is a section to an enlarged scale of the slidable rack member taken on the line 6—6 in FIGURE 1;

FIGURE 7 is a section to an enlarged scale of the extension member, the section being taken on the line 7—7 in FIGURE 1;

FIGURE 8 is a fragmentary sectional view of certain of the elements in nested and locked position, the plane of the section being indicated by the line 8—8 in FIGURE 3; and FIGURE 9 is a fragmentary sectional view taken on the line 9—9 in FIGURE 3.

While the car top boat handling device of the invention is susceptible of numerous physical embodiments, depending upon the environment and requirements of use, substantial numbers of the herein shown and described embodiment have been made, tested and used, and all have performed in an eminently satisfactory manner.

The device of the invention, generally designated by the reference numeral 12, is particularly useful in loading, transporating and unloading a boat 13 relative to an automobile 14 of the sedan or station wagon variety.

A main, stationary framework 16 is horizontally mounted on the vehicle top 17 by suitable, conventional brackets 18 carrying removable fastenings 19 clamped to the car's rain gutters 21.

Preferably, the framework 16 comprises a parallel, spaced pair of transverse channels 22 appropriately arranged in a centered or balanced location on the car top so that when the boat is being transported, neither the boat's bow nor its stern will project excessively from the car top in a fore and aft direction.

The channel 22 is U-shaped in cross-section with its upward arms re-bent to afford margins 23 of increased beam strength and smooth contour. A plurality of appropriately spaced registering openings 24 in the side walls 25 upstanding from the base 26 receive locking fastenings (see FIGURE 8), such as cotter pins 27, when the boat is being transported.

Adjacent one end, for example, the left-hand end of the channels 22, as appears in FIGURES 1, 3 and 4, the upper corners are beveled, as at 31, to eliminate any sharp projections, and the left hand end portion of the channel base 26 is cut away, along its margins, from the adjacent, upstanding side walls 25. This cut portion 32 of the channel base 26 is sharply recurved underneath and welded to itself, as at 33, for greater strength.

On the bottom of the doubled portion 32 there is mounted a bracket 34 projecting toward and upwardly at an angle (see FIGURE 3), the bracket terminating in a limit stop member 36 comprising a transverse rod 37 welded to the elevated end of the bracket 34 (see FIGURES 3 and 9).

The cutting and doubling under of the reinforcement portion 32 affords a recess 41 extending from the bottom end corner 42 of the terminally projecting wings 43 of the channel side walls 25 to the rounded shoulder 44 formed by the doubled under portion 32.

It is on this shoulder 44 that the ends of a pair of bottom flanges 51 of a slide member 52 is supported when the slide member is in extended and inclined attitude, as in FIGURES 1 and 4. The rounded shoulder 44, in other words, serves both as a support and as a pivot when the slide members 52 are maneuvered. Serving to confine the slide member 52 against lateral movement are the two wings 43 forming longitudinal extensions, as previously explained, of the upstanding channel side walls 25.

As appears most clearly in FIGURE 6, the slide members 52 are C-shaped in section with the C arranged in a prone position, i.e. opening downwardly. The vertical side walls 56 depend from a top plate 57 and terminate in the bottom pair of inwardly projecting flanges 51 which are supported on the channel shoulder 44, as explained above, when the slide member 52 is in inclined attitude.

The distant end 61 (see FIGURE 3) of the slide member 52 is provided with a vertical end plate 62, or tab, which serves to interfere with the transverse limit stop rod 37 on the channel, when the slide member is withdrawn, and thus serves to limit the extent of withdrawal of the slide member (see FIGURE 4). So, also, the bottom flanges 51 underlie the laterally projecting ends 64 of the limit stop rod 37 (see FIGURE 9) and thus prevent the ends 53 of the inclined slide members from becoming dislodged from the channel as the boat rack is maneuvered.

Adjacent each end of the sliding members 52 there is provided a pair of registering apertures 66 formed in the side walls 56. The location of these apertures is such that in fully nested condition the apertures 66 also register with the channel openings 24 thereby affording passageways for the locking pins 27.

The sliding members 52 are also each provided with a pair of elongated slots 68 in the top plate 57 to receive the neck 69 of a bolt 71. The bolts, two in number on each sliding member cooperate with nuts 72 to bias a pair of bowed, hold-down clamps 73 downwardly into engagement with the opposite gunwales 74 of the boat 13.

The shoulders 76 on the heads 75 of the bolts 71 engage the margins of the slots 68 and thereby enable the hold-down clamps to be adjustably shifted toward and away from the boat's gunwales, as required.

As can be seen most clearly in FIGURE 2, the two, spaced, parallel sliding members 52 are cross-connected by a pair of braces 81, the braces and the sliding members together forming a structure termed a boat rack, generally designated by the reference numeral 82.

For convenience, the braces are adjustable as to length. In the embodiment shown in FIGURE 2 a rod 83 has one end welded at 84 to the top plate 57 of one of the slide members, the other end 86 being inserted in a tube 87 welded at one end 88 to the top plate 57 of the other slide member. The rod-encompassing portion 91 of the tube 87 is threaded and is split on opposite sides, as at 92 and slightly flared. A threaded collar 93 serves to clamp the split portion 91 of the tube to the enclosed portion of the rod.

The ends 84 and 88 of the respective rod and tube are located on the slide members 57 at a position such as not to interfere with the gunwales 74 of the boat 13 as the boad it turned upside down and is clamped to the boat rack 82 in FIGURE 1.

Depending upon the width and height of the car, the slope of the terrain and the beam of the boat to be handled, the sliding members 52 may often be long enough to span the distance between the pivot structure 53 (see FIGURE 1) on the left hand end of the horizontal framework and the ground 96. In many instances, however, it is found convenient to afford a pair of extension members 102 formed so as to telescope into the slide members 52.

The extension members 102 are substantially M-shaped in section and include a troughed top 103 from which depends a pair of side plates 104 formed with registering apertures 106 adapted to receive cotter pin fastenings 27 in the manner previously explained. The trough in the top 103 affords clearance for the bolt heads 75 (see FIGURES 8 and 9).

It has been found that by extending the extension members 102 approximately to the amount shown in FIGURE 1 while mounting and demounting the boat 13, the resulting angle of inclination of the boat rack 82, about 45°, affords a very convenient slope.

Starting with the boat rack 82 in the attitude shown in FIGURE 1, the boat 13 is lifted, preferably by two people, and placed on the rack and secured by the four gunwale clamps 73, as in FIGURE 1.

The boat rack is thereupon elevated by grasping the extension members 102 and lifting. Concurrently, the boat rack pivots around the pivot members 53 and is shifted in the direction indicated by the arrow 108 in FIGURE 1. The slide members 52 are, in other words, translated along the supporting, U-shaped, stationary channels 22.

As the slide members come into substantial coincidence with the channels, the boat 13 is properly centered on the car top, as appears in outline in FIGURE 1. At this juncture, perhaps with some slight jockeying of the slide member, the openings 24 in the channel side walls 25 and the apertures 66 in the slide member side walls 56 are brought into registry.

Then the cotter pins 27 passing through the registering openings 66 and 106 in the slide members 52 and extension members 102, respectively (see FIGURE 1) are removed, thereby allowing the extension members 102 to be inserted within the slide members 52 in the manner shown in FIGURE 3. The apertures 106 in the extension members 102, in other words, are moved into registry with the apertures 66 in the slide members 52 and with the openings 24 in the channels 22. The cotter pins 27 are thereupon inserted and locked (see FIGURE 8) thus securing the slide members 52 and the extension members 102 to the channels 22.

Then, at the remote end (right-hand end in FIGURE 1) cotter pins 27 are also inserted through the registering openings 24 and 66 in the channels 22 and slide members 52, respectively.

At this juncture, the stationary framework 16 and the boat rack 82 are securely locked together and the extension members 102 are also securely confined. The boat can then be safely transporated to the destination.

In unloading the boat the foregoing steps are reversed. The various cotter pins 27 are first removed and the extension members 102 are extended and locked by cotter pins. In this connection, it is to be noted that by providing a series of apertures 106 along the sides 104 of the extension members 102, a choice is afforded in extending the members 102 to any desired length, within limits.

After extending the extension members 102 to the selected length, the boat rack is slid toward the left (as in FIGURE 1) and slowly tilted downwardly until the lower ends of the extension members 102 are supported on the ground 96.

The gunwale clamps 73 are thereupon loosened and the boat is removed.

For convenience and compactness of storage the slide and extension members are then returned to their nested position in the channels and at least one cotter pin is installed. The entire structure can, at this point, be removed from the car top by disconnecting the claiming brackets 19 from the vehicle's rain gutters 21.

It can therefore be seen that I have provided a sturdy, compact and reliable apparatus for readily and safely loading, unloading and transporting a boat on a car top.

What is claimed is:

1. A car top boat handling device comprising:
    (a) a horizontal framework having a pair of spaced, parallel, transverse channels removably mounted on a car top;
    (b) a boat rack including a pair of spaced, parallel slide members slidably disposed in said channels, and a bracing structure connecting said slide members to effect unitary movement thereof between a first, inclined position wherein one end of said pair of slide members is supported on the adjacent end of said pair of channels and the other end of said pair of slide members extends toward the ground, and a second, horizontal position wherein said pair of slide members is nested in said pair of channels in substantially registering relation thereto;

(c) a pair of extension members translatably disposed in said other end of said slide members;

(d) means for adjustably mounting said extension members within said slide members for selectively extending the effective length of said slide members;

(e) means for removably mounting a boat on said rack; and (f) means for positively limiting the outward movement of said pair of slide members as said rack is moved from said second position into said first position.

2. A car top boat handling device as in claim 1 wherein said positive limiting means comprises a tab on said one end of said pair of slide members, and a limit stop member mounted on said adjacent end of said pair of channels, said tab being brought into positive interfering relation with said limit stop as said rack is moved from said second, horizontal position into said first, inclined position.

References Cited

UNITED STATES PATENTS

| | | | |
|---|---|---|---|
| 2,551,351 | 5/1951 | Swenson | 214—450 |
| 3,064,841 | 11/1962 | Ellingson | 214—450 |
| 3,169,653 | 2/1965 | Stromberg | 214—450 |
| 3,186,569 | 6/1965 | Roux | 214—450 |
| 3,193,124 | 7/1965 | Essling | 214—450 |

HUGO O. SCHULZ, Primary Examiner